US012745164B2

(12) United States Patent
Li et al.

(10) Patent No.: US 12,745,164 B2
(45) Date of Patent: Sep. 22, 2026

(54) COMMUNICATION METHOD, COMMUNICATION APPARATUS, AND TERMINAL

(71) Applicant: HUAWEI TECHNOLOGIES CO., LTD., Shenzhen (CN)

(72) Inventors: Dejian Li, Beijing (CN); Mingchao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 18/613,532

(22) Filed: Mar. 22, 2024

(65) Prior Publication Data

US 2024/0267836 A1 Aug. 8, 2024

Related U.S. Application Data

(63) Continuation of application No. PCT/CN2022/120334, filed on Sep. 21, 2022.

(30) Foreign Application Priority Data

Sep. 23, 2021 (CN) ........................ 202111116176.X

(51) Int. Cl.

*H04W 48/16* (2009.01)
*H04W 48/10* (2009.01)
*H04W 72/541* (2023.01)

(52) U.S. Cl.

CPC .......... *H04W 48/16* (2013.01); *H04W 48/10* (2013.01); *H04W 72/541* (2023.01)

(58) Field of Classification Search

CPC ... H04W 48/16; H04W 48/10; H04W 72/541; H04W 8/005; H04W 84/18
See application file for complete search history.

(56) References Cited

U.S. PATENT DOCUMENTS 11,197,263 B1 * 12/2021 Tsai .................... H04W 16/14
2014/0254422 A1 9/2014 Mehta
2020/0267736 A1 * 8/2020 Hafeez ................. H04B 7/0695
2020/0305153 A1 * 9/2020 Hanley ............. H04W 72/0446

FOREIGN PATENT DOCUMENTS

CN 108738107 A 11/2018

OTHER PUBLICATIONS

Extended European Search Report for Application No. 22872032 dated Dec. 5, 2024, 8 pages.

* cited by examiner

*Primary Examiner* — Schquita D Goodwin

(57) ABSTRACT

An example method includes a first node scanning for another primary node based on a scanning parameter, and when the another primary node is not discovered through scanning, the first node listens to a first broadcast message based on random listening duration. The first node is a primary node of at least one communication domain, the first broadcast message is a broadcast message from one or more primary nodes in the another primary node, and the random listening duration is used by the first node to listen to the another primary node. The random listening duration is not fixed. Broadcast time periods of the first node and the another primary node are staggered, so that the first node can receive a broadcast message of the another primary node in the random listening duration.

20 Claims, 8 Drawing Sheets

500

510: A first node performs scanning on another primary node based on a scanning parameter 520: When the another primary node is not discovered through scanning, the first node listens to a first broadcast message based on random listening duration

COMMUNICATION METHOD, COMMUNICATION APPARATUS, AND TERMINAL

CROSS-REFERENCE TO RELATED APPLICATIONS

This application is a continuation of International Application No. PCT/CN2022/120334, filed on Sep. 21, 2022, which claims priority to Chinese Patent Application No. 202111116176.X, filed on Sep. 23, 2021. The disclosures of the aforementioned applications are hereby incorporated by reference in their entireties.

TECHNICAL FIELD

This application relates to the communication field, and more specifically, to a communication method, a communication apparatus, and a terminal.

BACKGROUND

In a wireless communication scenario, a plurality of communication domains may be included in a specific communication area or range. The communication domain may be a system including a group of nodes and a communication link between the nodes. One communication domain may include one primary node and at least one secondary node. The primary node may also be referred to as a management node or a grant (G) node, may manage a time-frequency resource of the communication domain to which the primary node belongs, and has a function of scheduling a resource for the communication link in the communication domain. The secondary node may also be referred to as a terminal node, and may be briefly referred to as a T node.

When coordination and management are performed between a plurality of communication domains (which may be briefly referred to as multi-domain), primary nodes first need to perform device discovery. However, in some cases, the primary nodes cannot discover each other in a timely manner. For example, when a plurality of primary nodes simultaneously perform neighbor device discovery, the plurality of primary nodes may not discover each other because the plurality of primary nodes are all in a scanning state or a broadcast state. Therefore, device discovery efficiency is relatively low.

SUMMARY

This application provides a communication method, a communication apparatus, and a terminal, to improve device discovery efficiency.

According to a first aspect, this application provides a communication method. The method may be performed by a first node, or may be performed by a component (such as a chip or a chip system) configured on the first node, or may be performed by a logical module or software that can implement all or some functions of the first node. This is not limited in this application.

For example, the method includes: The first node performs scanning on another primary node based on a scanning parameter, where the first node is a primary node (a node G) of at least one communication domain; and when the another primary node is not discovered through scanning, the first node listens to a first broadcast message based on random listening duration, where the first broadcast message is a broadcast message from one or more primary nodes in the another primary node, and the random listening duration is used by the first node to listen to the another primary node.

Based on the foregoing solution, when the first node performs scanning on the another primary node based on the scanning parameter, but does not discover the another primary node through scanning, the first node may continue to listen, based on one random listening duration, to whether the another primary node sends the first broadcast message. The random listening duration is not fixed, and random listening duration of different nodes may also be different. In this case, broadcast time periods of the first node and another primary node may be staggered, and the first node may discover the another primary node in the random listening duration. This can alleviate a problem that the first node and the another primary node cannot discover each other because the first node and the another primary node are both in a scanning state or a broadcast stat, and improve device discovery efficiency.

In addition, device discovery based on the broadcast message has a low requirement on the primary node, and device discovery between primary nodes can be performed without requiring the primary node to have an active probe capability. The active probing capability may be understood as that the primary node needs to send a probe request frame.

With reference to the first aspect, in some possible implementations, that the first node performs scanning based on a scanning parameter includes: When a trigger condition is met, the first node performs scanning based on the scanning parameter. The trigger condition includes: The first node is powered on, the first node detects interference, the first node enables a multi-domain service function, the first node receives a scanning request message from a second node, or the first node performs periodic scanning. The second node is a primary node other than the first node.

That the trigger condition is that the first node performs periodic scanning may specifically mean that the first node performs periodic scanning, and a timer of periodic scanning stops timing. The timer of periodic scanning may be specifically configured to perform timing by using device discovery duration as a cycle. It should be understood that the device discovery duration is greater than scanning duration and the random listening duration, and the scanning duration and the random scanning duration may be included in the device discovery duration.

Based on different trigger conditions, the first node may perform blind scanning or targeted scanning. For example, the trigger condition is: The first node is powered on, the first node detects the interference, the first node enables the multi-domain service function, or the first node performs periodic scanning, and the first node may perform blind scanning. Blind scanning may be understood as scanning without a target, provided that another specific primary node is discovered, or provided that a first broadcast message of another specific primary node is received. For another example, the trigger condition is that the first node receives the scanning request message from the second node, where the scanning request message may indicate a target primary node to be discovered by the first node, and the first node may scan the target primary node in a targeted manner based on the scanning request message, that is, receive a first broadcast message of the target primary node in a targeted manner. The primary node may perform scanning when the node is powered on, or enables the multi-domain service, or performs periodic scanning as usual, and may perform scanning when the node detects the interference, or receives the scanning request message from the second node. This can support more scanning scenarios. Therefore, when the first node detects the interference and triggers scanning, a problem that device discovery cannot be performed when mutual interference exists between the first node and the another primary node can be further resolved.

With reference to the first aspect, in some possible implementations, when the trigger condition is: The first node is powered on, the first node detects the interference, the first node enables the multi-domain service function, or the first node performs periodic scanning, the scanning parameter is a predefined or preconfigured scanning parameter; or when the trigger condition is that the first node receives the scanning request message from the second node, the scanning parameter is determined based on the scanning request message.

When trigger conditions for triggering scanning are different, scanning parameters may be different. When the trigger condition is: The first node is powered on, the first node detects the interference, the first node enables the multi-domain service function, or the first node performs periodic scanning, or the first node performs blind scanning, the scanning parameter may be predefined or preconfigured. Being predefined or preconfigured may be understood as being predetermined by the first node. When the trigger condition is that the first node receives the scanning request message from the second node, or the first node performs targeted scanning based on the scanning request message, the scanning parameter is determined based on content in the scanning request message.

With reference to the first aspect, in some possible implementations, the scanning request message includes at least one of the following: an identifier of a to-be-scanned carrier (an operating carrier), a scanning start time offset, scanning duration on a single carrier, and information about a target primary node, where the target primary node is a primary node that is to be discovered by the first node and that is indicated in the scanning information.

The first node may scan the target primary node in a targeted manner based on the information indicated in the scanning request message such as the identifier of the to-be-scanned carrier, the scanning start time offset, the scanning duration on the single carrier, and the information about the target primary node.

Optionally, the information about the target primary node includes at least one of the following: an identifier of an operating carrier of the target primary node, a priority of the target primary node, a sending periodicity of a communication domain system message of the target primary node, and duration of the communication domain system message of the target primary node. The operating carrier of the target primary node belongs to the to-be-scanned carrier.

Therefore, the scanning request message may include frame synchronization information of the to-be-scanned target primary node, for example, the sending periodicity of the communication domain system message of the target primary node, duration of the broadcast message, for example, the duration of the communication domain system message of the target primary node, a carrier channel number, for example, the identifier of the operating carrier of the target primary node, and the like. The first node may perform targeted scanning based on the target primary node indicated in the scanning request message, that is, scanning is performed only on the operating carrier of the target primary node in a sending time period of the broadcast information of the target primary node. In this way, compared with scanning all carriers or channels, this manner can greatly reduce scanning duration and overheads, and increase a probability of discovering the target primary node through scanning.

Optionally, the scanning parameter includes at least one of the following: the identifier of the to-be-scanned carrier, total scanning duration, and the scanning duration on the single carrier.

Optionally, the to-be-scanned carrier includes: a current operating carrier of the first node, or all carriers supported by the first node, or a carrier indicated in the scanning request message received by the first node.

It should be understood that the to-be-scanned carrier may be one carrier or may be a plurality of carriers. When the to-be-scanned carrier is the plurality of carriers, within a capability range of the first node, the first node may concurrently scan the plurality of carriers, and may not scan the carriers one by one, so that device discovery can be quickly performed.

With reference to the first aspect, in some possible implementations, the method further includes: The first node discovers a third node based on the first broadcast message, where the third node does not belong to a primary node in an associated primary node information table, and the associated primary node information table includes a primary node associated with the first node as a secondary node; and the first node sends an association request message to the third node in a secondary node mode.

The first node receives a first broadcast message of the third node, that is, the first node discovers the third node, and the first node determines that the third node is not in the associated primary node information table maintained by the first node. Therefore, the third node is not associated with the first node. In this case, the first node may send the association request message to the third node, so that the first node can associate with the third node as a secondary node. This avoids repeated association.

With reference to the first aspect, in some possible implementations, the method further includes: The first node discovers a fourth node based on the first broadcast message, where the fourth node belongs to a primary node in an associated primary node information table, and the associated primary node information table includes a primary node associated with the first node as a secondary node; and the first node skips sending an association request message to the fourth node.

The first node receives a first broadcast message of the fourth node, that is, the first node discovers the fourth node, and the first node determines that the fourth node is in the associated primary node information table maintained by the first node. Therefore, the fourth node first discovers the first node and is associated with the first node, in other words, the fourth node is already a secondary node of the first node. Therefore, to avoid repeated association caused by association of the first node with the fourth node as the secondary node, the first node may stop sending the association request message to the fourth node, or the first node may skip sending the association request message to the fourth node.

Optionally, the associated primary node information table includes one or more of the following information about at least one primary node: an identifier of an operating carrier, a physical layer address, a domain name, a domain identifier (identity, ID), and multi-domain service information.

With reference to the first aspect, in some possible implementations, the random listening duration is generated by a predefined function f(N), and N is a random number greater than or equal to 0.

In a possible design, the random listening duration satisfies: $T_M=f(N)=NT_F$, where $T_M$ indicates the random listening duration, and $T_F$ indicates a preset time length.

Optionally, $T_F$ is M times duration of eight superframes, M≥0, and M is an integer.

For example, M=8, that is, $T_F$ is duration of 64 superframes.

Optionally, $T_F$ is duration of one superframe, duration of one half superframe, or duration of one radio frame.

The first node may determine a specific value of the random listening duration based on the predefined function, and duration of each listening may be randomly generated.

With reference to the first aspect, in some possible implementations, the random listening duration is determined based on a predefined mapping relationship, the mapping relationship includes a correspondence between a plurality of values of i and the random listening duration, i indicates a quantity of times of listening performed by one node, and i is an integer greater than or equal to 0.

The first node may determine a specific value of current random listening duration based on the predefined mapping relationship and a number of listening times.

With reference to the first aspect, in some possible implementations, the method further includes: The first node sends a second broadcast message on at least one carrier, where sending time of the second broadcast message is not later than planned end time of the random listening duration, the second broadcast message is used by the another primary node to discover the first node, and the at least one carrier includes the operating carrier of the first node or all the carriers supported by the first node.

It should be understood that, being not later than the planned end time of the random listening duration may be understood as being before the planned end time of the random listening duration or being at the planned end time of the random listening duration.

The planned end time may be understood as time at which a random listening duration timer ends. For example, if one random listening duration determined by the first node is the duration of one superframe, the planned end duration is end time of the duration of one superframe.

If the first node performs targeted scanning based on the indication information of the scanning request message, and discovers the target primary node before the planned end time of the random listening duration, the first node may end listening in advance, enter a broadcast state, and send the second broadcast message on the at least one carrier. If the first node performs blind scanning, or the first node performs targeted scanning based on the indication information of the scanning request message, but does not discover the target primary node at the planned end time of the random listening duration, the first node may enter a broadcast state at the planned end time of the random listening duration, and send the second broadcast message on the at least one carrier.

The first node may perform scanning, listening, and broadcasting on all operating carriers (which may be a plurality of carriers) or channels of the first node, to discover the another primary node and to be discovered by the another primary node.

According to a second aspect, this application provides a communication apparatus. The communication apparatus includes: a scanning unit, configured to perform scanning based on a scanning parameter, where the scanning includes scanning of another primary node; and a listening unit, configured to: when the another primary node is not discovered through scanning, listen to a first broadcast message based on random listening duration, where the first broadcast message is a broadcast message from one or more primary nodes in the another primary node, the random listening duration is used by the first node to listen to the another primary node, and the first node is a primary node of at least one communication domain.

With reference to the second aspect, in some possible designs, the scanning unit is configured to: when a trigger condition is met, perform scanning based on the scanning parameter. The trigger condition includes: The first node is powered on, the first node detects interference, the first node enables a multi-domain service function, the first node receives a scanning request message from a second node, or the first node performs periodic scanning. The second node is a primary node other than the first node.

With reference to the second aspect, in some possible designs, when the trigger condition is: The first node is powered on, the first node detects the interference, the first node enables the multi-domain service function, or the first node performs periodic scanning, the scanning parameter is a predefined or preconfigured scanning parameter; or when the trigger condition is that the first node receives the scanning request message from the second node, the scanning parameter is determined based on the scanning request message.

With reference to the second aspect, in some possible designs, the scanning request message includes at least one of the following: an identifier of a to-be-scanned carrier, a scanning start time offset, scanning duration on a single carrier, and information about a target primary node, where the target primary node is a primary node that is to be discovered by the first node and that is indicated in the scanning information.

Optionally, the information about the target primary node includes at least one of the following: an identifier of an operating carrier of the target primary node, a priority of the target primary node, a sending periodicity of a communication domain system message of the target primary node, and duration of the communication domain system message of the target primary node. The operating carrier of the target primary node belongs to the to-be-scanned carrier.

Optionally, the scanning parameter includes at least one of the following: the identifier of the to-be-scanned carrier, total scanning duration, and the scanning duration on the single carrier.

Optionally, the to-be-scanned carrier includes: a current operating carrier of the first node, or all carriers supported by the first node, or a carrier indicated in the scanning request message received by the first node.

With reference to the second aspect, in some possible designs, the apparatus further includes a sending unit. The sending unit is configured to: when the first node discovers a third node based on the first broadcast message, where the third node does not belong to a primary node in an associated primary node information table, send an association request message to the third node in a secondary node mode, where the associated primary node information table includes a primary node associated with the first node as a secondary node.

With reference to the second aspect, in some possible designs, the apparatus further includes a sending unit. The sending unit is configured to: when the first node discovers a fourth node based on the first broadcast message, where the fourth node belongs to a primary node in an associated primary node information table, skip sending the association request message to the fourth node, where the associated primary node information table includes a primary node associated with the first node as a secondary node.

Optionally, the associated primary node information table includes one or more of the following information about at least one primary node: an identifier of an operating carrier, a physical layer address, a domain name, and multi-domain service information.

With reference to the second aspect, in some possible designs, the random listening duration is generated by a predefined function f(N), and N is a random number greater than or equal to 0.

In a possible design, the random listening duration satisfies: $T_M=f(N)=NT_F$, where $T_M$ indicates the random listening duration, and $T_F$ indicates a preset time length.

Optionally, $T_F$ is M times duration of eight superframes, M≥0, and M is an integer.

For example, M=8, that is, $T_F$ is duration of 64 superframes.

Optionally, $T_F$ is duration of one superframe, duration of one half superframe, or duration of one radio frame.

With reference to the second aspect, in some possible designs, the random listening duration is determined based on a predefined mapping relationship, the mapping relationship includes a correspondence between a plurality of values of i and the random listening duration, i indicates a quantity of times of listening performed by one node, and i is an integer greater than or equal to 0.

With reference to the second aspect, in some possible implementations, the apparatus further includes a sending unit. The sending unit is configured to send a second broadcast message on at least one carrier, where sending time of the second broadcast message is not later than planned end time of the random listening duration, the second broadcast message is used by the another primary node to discover the first node, and the at least one carrier includes the operating carrier of the first node or all the carriers supported by the first node.

According to a third aspect, this application provides a communication apparatus, where the communication apparatus includes a processor. The processor is coupled to a memory, and may be configured to execute a computer program in the memory, to perform the communication method in any one of the first aspect or the possible implementations of the first aspect.

Optionally, the communication apparatus further includes the memory.

Optionally, the communication apparatus further includes a communication interface, and the processor is coupled to the communication interface.

According to a fourth aspect, this application provides a chip system. The chip system includes at least one processor, configured to support implementation of the functions in any one of the first aspect and the possible implementations of the first aspect, for example, receiving or processing data and/or information in the foregoing method.

In a possible design, the chip system further includes a memory. The memory is configured to store program instructions and data, and the memory is located inside the processor or outside the processor.

The chip system may include a chip, or may include a chip and another discrete device.

According to a fifth aspect, this application provides a computer-readable storage medium. The computer storage medium stores a computer program (which may also be referred to as code or instructions). When the computer program is run by a processor, the method in any one of the first aspect or the possible implementations of the first aspect is performed.

According to a sixth aspect, this application provides a computer program product. The computer program product includes a computer program (also referred to as code or instructions). When the computer program is run, the method in any one of the first aspect or the possible implementations of the first aspect is performed.

According to a seventh aspect, this application provides a terminal. The terminal includes the communication apparatus according to the second aspect or the third aspect.

Optionally, the terminal is a vehicle.

It should be understood that technical solutions of the second aspect to the seventh aspect of this application correspond to the technical solution of the first aspect of this application, and beneficial effects achieved in the aspects and corresponding feasible implementations are similar. Details are not described.

DESCRIPTION OF EMBODIMENTS

Figure 1:
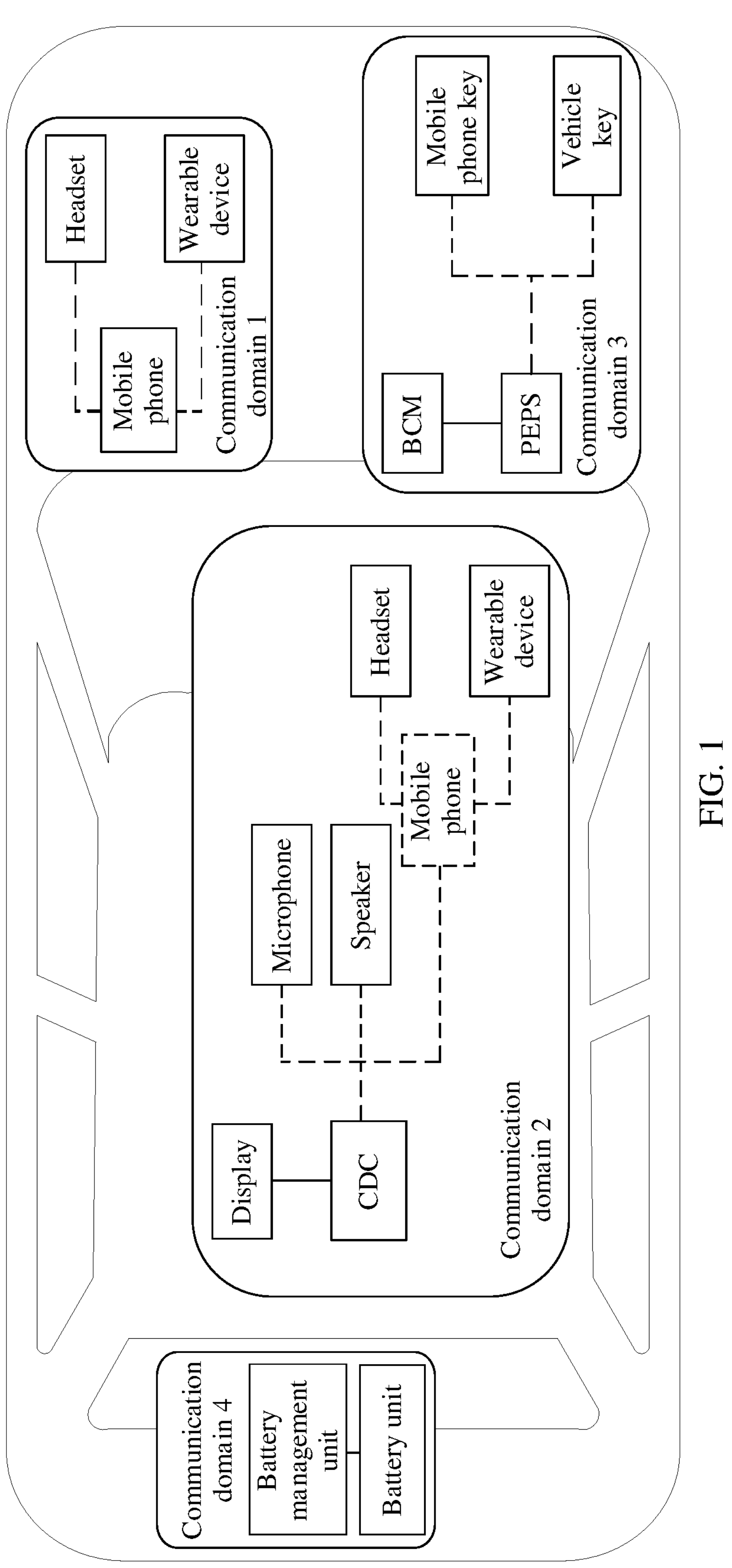
FIG. 1 is a schematic diagram of a topological relationship of an in-vehicle communication link according to an embodiment of this application.

The following describes technical solutions of this application with reference to accompanying drawings.

The terms “first”, “second”, and the like in this specification and claims of this application are used to distinguish between similar objects instead of describing a specific order or sequence. It should be understood that data termed in such a way is interchangeable in proper circumstances, so that embodiments of this application described herein can be implemented in an order other than the order illustrated or described herein. In addition, terms “include”, “have”, and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

In embodiments of this application, “at least one” means one or more, and “a plurality of” means two or more. “And/or” describes an association relationship between associated objects, and indicates that three relationships may exist. For example, A and/or B may represent the following cases: Only A exists, both A and B exist, and only B exists. A and B each may be singular or plural. The character “/”

generally indicates an "or" relationship between the associated objects. "At least one of the following items" or a similar expression thereof refers to any combination of these items, including a singular item or any combination of plural items. For example, at least one of a, b, or c may indicate: a or b or c; a and b; a and c; b and c; or a, b, and c. a, b, and c each may be singular or plural.

A communication apparatus in embodiments of this application may be a vehicle-mounted device such as a vehicle head unit, a vehicle-mounted speaker, a vehicle-mounted microphone, a battery management system (BMS), a battery unit, a battery management unit (BMU), or a battery pack (including a plurality of battery units), or may be an electronic device such as a mobile phone, a tablet computer, a desktop notebook computer, a laptop computer, an ultra-mobile personal computer (UMPC), a handheld computer, a netbook, a personal digital assistant (PDA), a wearable electronic device, or a virtual reality device.

Alternatively, the communication apparatus in embodiments of this application may be an intelligent terminal that has a function of performing the communication method provided in embodiments of this application and that is other than a vehicle, or may be disposed in another intelligent terminal that has a function of performing the communication method provided in embodiments of this application and that is other than a vehicle, or may be disposed in a component of the intelligent terminal. The intelligent terminal may be another terminal device such as an intelligent transportation device, a smart home device, or a robot. The apparatus may include, but is not limited to, an intelligent terminal or another sensor such as a controller, a chip, a radar, or a camera in the intelligent terminal, another component, and the like. Alternatively, the communication apparatus in embodiments of this application may be a functional module, for example, a chip system, disposed in any one of the foregoing devices.

Due to diversified in-vehicle applications, a quantity and types of in-vehicle communication nodes both increase, which imposes a higher requirement on an in-vehicle communication capability. Compared with existing wired communication, in-vehicle wireless communication can further reduce a quantity of harnesses, a length of the harness, and a weight of the harness in the vehicle, and corresponding installation or maintenance costs. This drives in-vehicle communication technologies to gradually develop toward wireless.

Usually, a topology relationship of an in-vehicle communication link is shown in FIG. 1. It can be learned from FIG. 1 that there are a plurality of communication domains in a vehicle. One communication domain includes one primary node and at least one secondary node. The primary node schedules the secondary node, to transmit service data between the primary node and the secondary node. For example, in FIG. 1, a mobile phone, a headset, and a wearable device belong to one communication domain, for example, referred to as a communication domain 1. The mobile phone is a primary node, and both the headset and the wearable device are secondary nodes. A cockpit domain controller (CDC), a display, a microphone, and a speaker belong to one communication domain, for example, referred to as a communication domain 2.

The CDC is a primary node, and both the microphone and the speaker are secondary nodes. A passive entry passive start (PEPS) system, a vehicle body control module (BCM), a mobile phone key, and a vehicle key belong to one communication domain, for example, referred to as a communication domain 3. The PEPS system is a primary node, and both the mobile phone key and the vehicle key are secondary nodes. In a BMS system, both a battery management unit and a battery unit belong to one communication domain, for example, referred to as a communication domain 4. The battery management unit is a primary node, and the battery unit is a secondary node. In addition, a primary node in one communication domain may also be used as a secondary node in another communication domain. For example, the mobile phone in the communication domain 1 may be used as a secondary node in the communication domain 2.

It should be understood that FIG. 1 is only an example. An actual topology relationship of an in-vehicle communication link may include more or fewer communication domains and nodes. This is not limited in this application.

To make the method provided in this application clearer, some terms and concepts in this application are first briefly described.

1. Cockpit domain controller: briefly referred to as a vehicle head unit. In addition to conventional functions such as radio, playing music and a video, and navigation, a current vehicle head unit has a cellular communication function (3G, 4G, 5G, and the like), and can implement information communication between a human and a vehicle and between the vehicle and an external environment by using a controller area network (CAN) bus technology of the vehicle. This enhances functions related to user experience, a service, and safety.

2. Primary node and secondary node: Two types of nodes distinguished by logical functions are a primary node (namely, a G node) and a secondary node (namely, a T node). The primary node manages the secondary node, has a resource allocation function, and is responsible for allocating a wireless communication resource to the secondary node. The secondary node communicates, based on scheduling of the primary node, with the primary node by using the resource allocated by the primary node. Nodes may be various communication apparatuses. For example, the primary node is a mobile phone, and the secondary node is a headset. A communication connection is established between the mobile phone and the headset, to implement data exchange. The mobile phone manages the headset. The mobile phone has a resource allocation function, and may allocate a resource to the headset. For another example, the primary node is a battery management unit, the secondary node is a battery unit, and a communication connection is established between the battery management unit and the battery unit. The battery management unit may allocate a resource to the battery unit. The battery unit sends information such as a status of the battery unit to the battery management unit, so that the battery management unit intelligently manages each battery unit.

It should be understood that a plurality of battery units may be packed into one battery pack, and the battery pack may also be used as the secondary node to communicate with the battery management unit.

3. Communication domain: a system that includes a group of communication nodes that have a communication relationship, and a communication connection relationship between the communication nodes. One apparatus or device may be in a plurality of communication domains. For example, as shown in FIG. 1, when the mobile phone performs wireless communication with the headset, the mobile phone is the primary node in the communication domain 1 including the mobile phone and the headset, and the headset is the secondary node. Then, after the mobile phone detects the CDC and establishes a wireless connection to the CDC, the mobile phone is also in the communication domain 2 including the mobile phone and the CDC. The CDC is the primary node in the communication domain 2, the mobile phone is the secondary node, and the mobile phone obeys scheduling of the CDC. The communication domain 2 may further include another secondary node such as a speaker and a microphone. For another example, when the battery management unit performs wireless communication with a plurality of battery units, the battery management unit is the primary node in the communication domain 4 that includes the battery management unit and the plurality of battery units, and the plurality of battery units are secondary nodes.

4. Carrier and channel: In the field of wireless communication, the carrier is a continuous signal that operates at a predefined single frequency, and a radio channel (briefly referred to as the channel) is a data signal transmission channel that uses a radio signal as a transmission medium. In this application, a carrier may be 20 mega (M) hertz (Hz), and a channel may be 0.24 MHz. One carrier may include a plurality of channels (0.24 MHz), or one carrier may cover a plurality of channels. However, a center frequency of each 20 MHz carrier available to each frequency band corresponds to one channel number, that is, each 20 MHz carrier corresponds to one 20 MHz channel. Therefore, when no ambiguity occurs, the carrier is also referred to as the channel. It should be understood that the node may operate on one carrier, or may simultaneously operate on a plurality of carriers.

5. Broadcast message: The broadcast message in this application may include physical layer broadcast information and a communication domain system message (DomainSysInfo) of a media access layer. The physical layer broadcast information and corresponding cyclic redundancy check (CRC) have 63 bits (bite, bit) in total, and are used to carry a physical layer configuration parameter. The communication domain system message is broadcast information of the media access layer, is a message sent by a primary node in a communication domain to a secondary node in the communication domain in a broadcast manner, and may include information such as a sending periodicity of the communication domain system message, sending duration of the communication domain system message, a domain name, a domain identifier, an identifier of an operating carrier or an operating channel number of the primary node, an operating carrier configuration, access control, a superframe mode, a competitive resource configuration, and whether a multi-domain service function is currently performed. Whether the multi-domain service function is currently performed may be determined by using two information elements, namely, multi-domain synchronization information and/or a domain coordination resource configuration set, in the communication domain system message. The operating carrier is a carrier of the communication domain in which the primary node operates, and each communication domain corresponds to one or more operating carriers.

When the primary node simultaneously uses a plurality of carriers, the primary node may transmit, on each used carrier, a physical layer signal and physical layer control information that are applicable to the carrier, and may perform synchronization on the plurality of carriers.

6. Superframe: Duration of each superframe may be 1 millisecond (ms). One superframe may include 48 or another quantity of time units. The time unit herein is a time unit having a same structure as a first time unit and/or a time unit having a same structure as a second time unit. The following uses 48 time units as an example for description.

In an example, in the superframe, an even-numbered frame whose frame number is 0, 2, 4, or the like is the time unit having the same structure as the first time unit, and an odd-numbered frame whose frame number is 1, 3, 5, or the like is a time unit having the same structure as the second time unit. In another example, frames whose frame numbers are 0 to 23 in the superframe are time units having the same structure as the first time unit, and frames whose frame numbers are 24 to 47 are time units having the same structure as the second time unit.

In another example, frames whose frame numbers are 0 to 10 in the superframe are time units having the same structure as the second time unit, and frames whose frame numbers are 11 to 47 are time units having the same structure as the first time unit.

It should be understood that a sending periodicity of a broadcast message by the node may be duration of one superframe. For example, the duration of one superframe may be 1 ms, and duration of a half superframe is a half of the duration of one superframe. That is, duration of one half superframe may be 0.5 ms. One superframe may include 48 radio frames. Therefore, duration of one radio frame may be $\frac{1}{48}$ ms. It should be further understood that specific values of the duration of the superframe, the duration of the half superframe, and the duration of the radio frame are not limited in this application.

It should be understood that the communication method provided in embodiments of this application is mainly applied to an in-vehicle wireless communication scenario. However, the communication method provided in embodiments of this application may also be applied to another wide area wireless communication scenario or a local area wireless communication scenario. It should be further understood that the communication method provided in embodiments of this application may be applied to autonomous driving, assisted driving, and the like, or may be applied to an internet of vehicles, for example, vehicle-to-everything (vehicle to X, V2X), long term evolution-vehicle (LTE-V), or vehicle-to-vehicle (vehicle to vehicle, V2V). This is not limited in this application.

Figure 2:
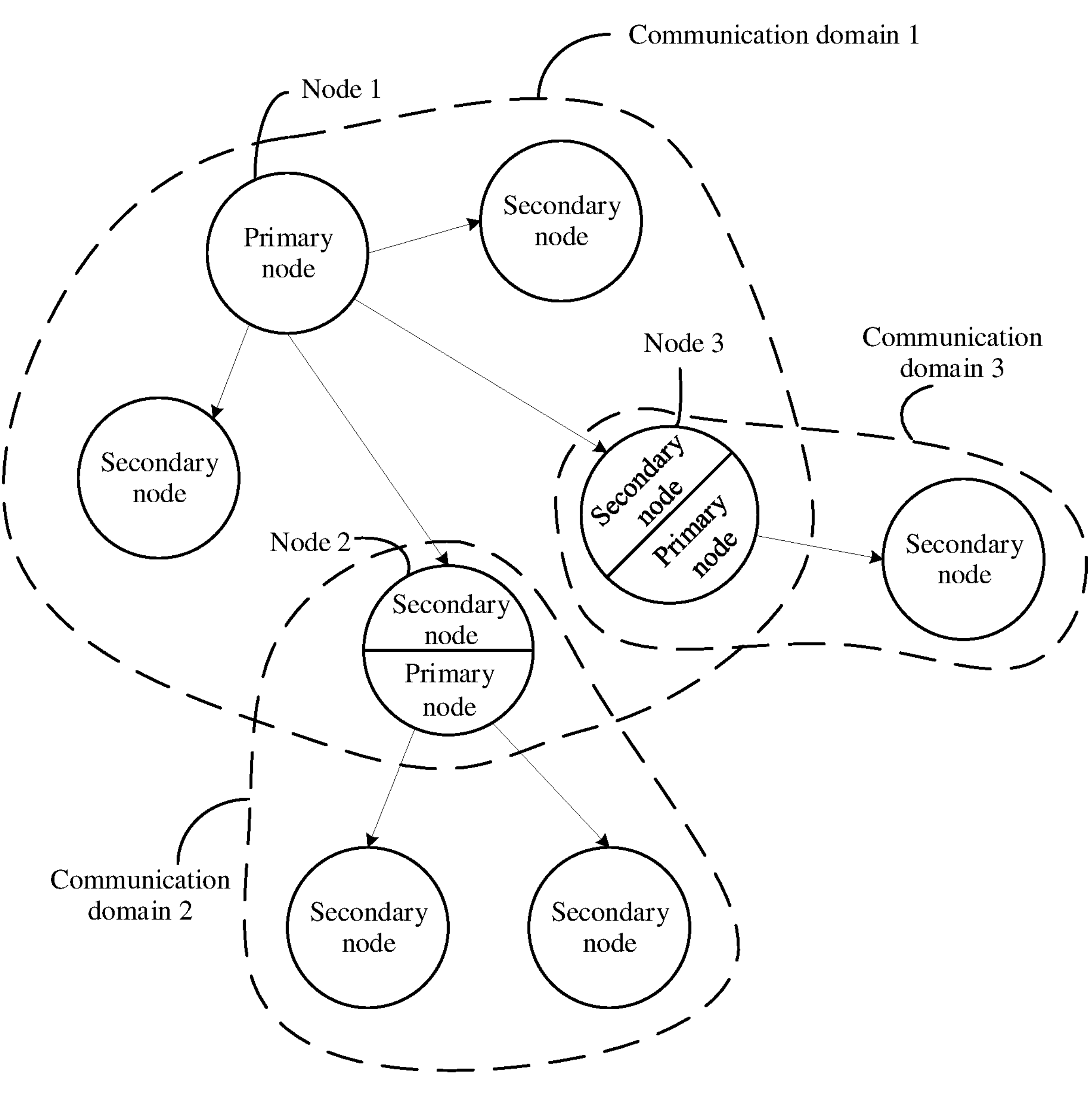
FIG. 2 is a schematic diagram of a multi-domain communication scenario according to an embodiment of this application.

In the wireless communication scenario, or the another wide area wireless communication scenario, or the local area wireless communication scenario, a plurality of communication domains may be included in a specific communication area or range. When coordination and management are performed between the plurality of communication domains (which may be referred to as multi-domain), device discovery first needs to be performed between primary nodes. FIG. 2 is a schematic diagram of a multi-domain communication scenario. In the multi-domain communication scenario shown in FIG. 2, there are three communication domains: a communication domain 1, a communication domain 2, and a communication domain 3. The communication domain 2 is a communication domain including a node 2 and two secondary nodes of the node 2. The communication domain 3 is a communication domain including a node 3 and one secondary node of the node 3. The communication domain 1 is a communication domain including a node 1 and four secondary nodes of the node 1. In the communication domain 1, the four nodes of the node 1 include the node 2 and the node 3. In the multi-domain communication scenario, the node 2 and the node 3 join the communication domain 1 of the node 1 as secondary nodes through neighbor device discovery.

It should be understood that FIG. 2 is only an example. In an actual multi-domain communication scenario, more or fewer communication domains may be included, and each communication domain includes one primary node and at least one secondary node. In the multi-domain communication scenario, a quantity of communication domains and a quantity of secondary nodes in the communication domain are not limited in this application.

Figure 3:
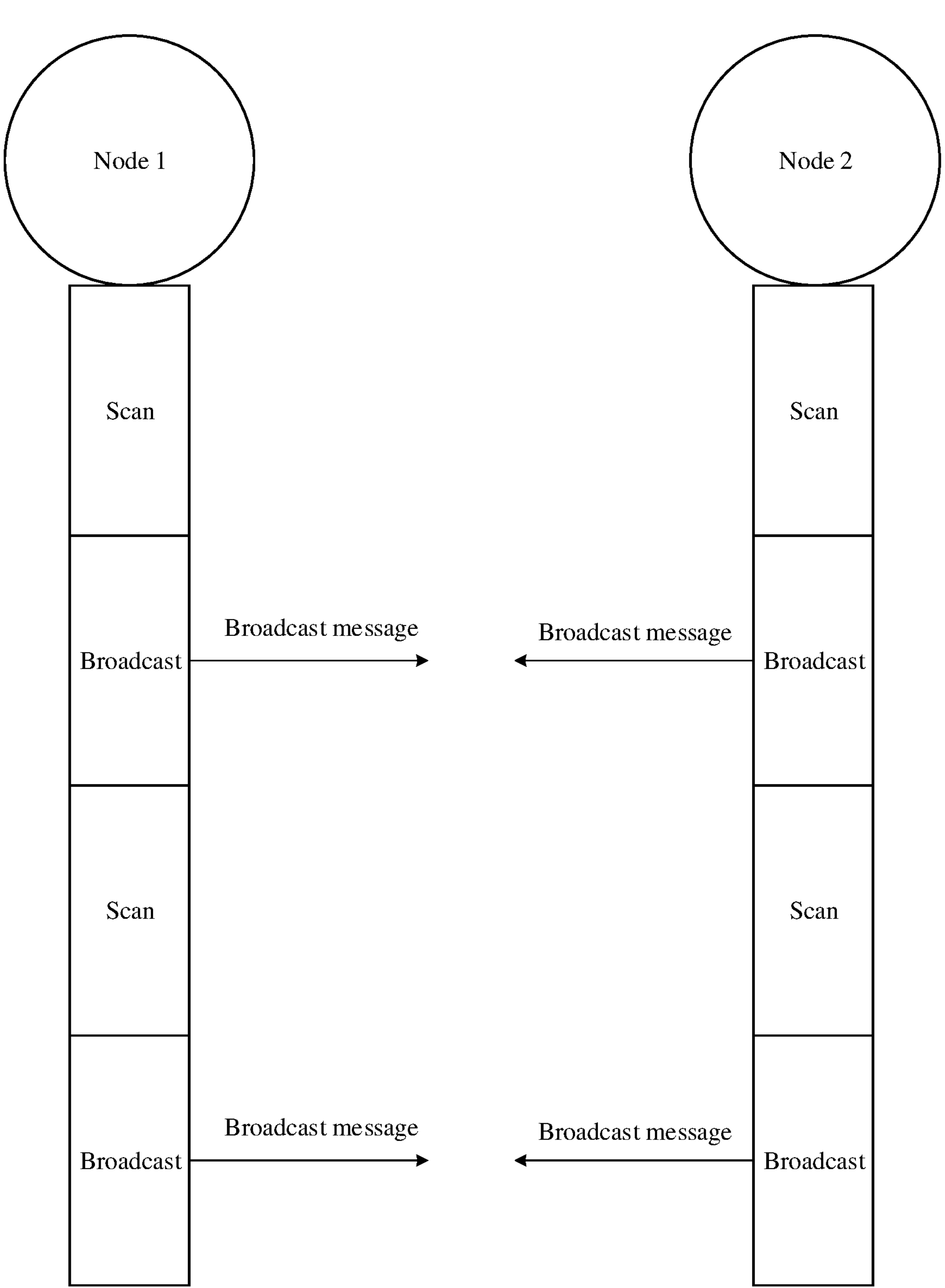
FIG. 3 is a schematic diagram of device discovery between nodes.

However, in some cases, the primary nodes may not detect each other in time. For example, when a plurality of primary nodes simultaneously perform device discovery, the plurality of primary nodes may not discover each other because the plurality of primary nodes are all in a scanning state or a broadcast state. As shown in FIG. 3, a node 1 and a node 2 may perform device discovery. However, when the node 1 performs scanning, the node 2 also performs scanning, and neither of the node 1 and the node 2 can discover each other during scanning. In other words, the node 1 and the node 2 can neither receive a broadcast message from each other, nor discover each other. After scanning ends, the node 1 enters a broadcast state, and sends a broadcast message, expecting to be discovered by a primary node other than the node 1. However, when the node 1 enters the broadcast state, the node 2 may also enter the broadcast state, and the node 2 also sends a broadcast message, expecting to be discovered by a primary node other than the node 2. After entering the broadcast state, the node 1 and the node 2 can neither receive a broadcast message from each other, nor discover each other.

Therefore, this application provides a communication method and a communication apparatus. After scanning ends, one random listening duration is added, so that the primary node can listen to a broadcast message of a primary node other than the primary node in the random listening duration. This can avoid a case in which primary nodes cannot discover each other due to simultaneous listening or simultaneous broadcasting.

It should be noted that embodiments of this application relate to a plurality of terms such as device discovery (sometimes referred to as discovery), scanning (scan), and listening (listen). Scanning and listening may be technical means for the node to perform device discovery. Scanning and listening may also be understood as keeping a state of receiving data, information, a message, or the like on one or more carriers or channels. Scanning and listening are defined to distinguish operations performed in different time periods. Scanning needs to be performed based on a scanning parameter, and a scanning channel range is determined by the scanning parameter, and is irrelevant to a quantity of current operating carriers of the primary node. Listening is performed by the primary node on a current operating carrier, and listening duration may be based on the random listening duration. For example, one node performs scanning and listening on one carrier or channel, to determine whether there is a broadcast message sent by another primary node on the carrier or channel. If a broadcast message of another primary node is received when scanning or listening is performed on one or more carriers or channels, it may be considered that the another primary node is discovered through scanning or listening, or in other words, device discovery is completed.

Figures 4, 5:
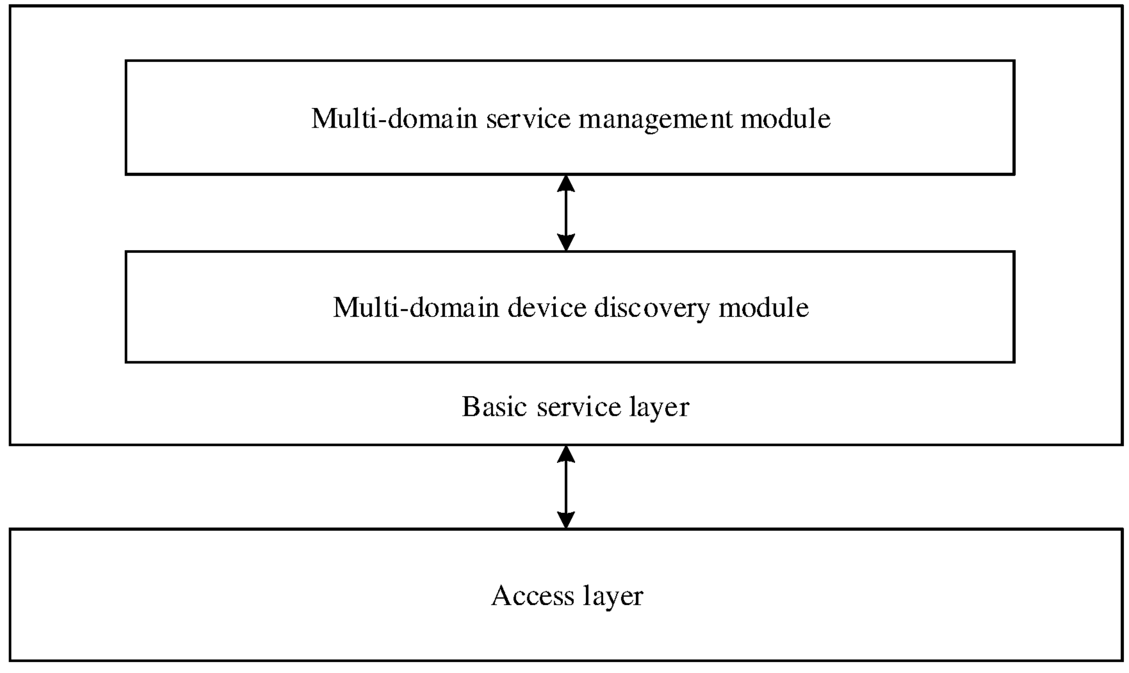
FIG. 4 is a block diagram of software structure of a node applicable to a communication method according to an embodiment of this application.
FIG. 5 is a schematic flowchart of a communication method according to an embodiment of this application.

FIG. 4 is a block diagram of software structure of a node applicable to a communication method according to an embodiment of this application.

As shown in FIG. 4, the node in this application may include at least an access layer and a basic service layer. The basic service layer may further include a multi-domain service management module and a multi-domain device discovery module. The multi-domain service management module may have a function of coordinating and managing a multi-domain service. For example, the multi-domain service management module may indicate, based on different device discovery trigger conditions, the multi-domain device discovery module to configure a scanning parameter, and may further generate association indication information based on a scanning and listening result. The association indication information indicates the access layer to send an association request/response message.

The following describes the communication method provided in embodiments of this application with reference to the accompanying drawings.

FIG. 5 is a schematic flowchart of a communication method according to an embodiment of this application. The communication method 500 includes step 510 and step 520. The following describes step 510 and step 520 in detail.

In step 510, a first node performs scanning on another primary node based on a scanning parameter.

It should be understood that the first node may be a primary node of at least one communication domain, and the another primary node may be one or more primary nodes other than the first node.

As described above, scanning may be understood as a manner of receiving data, information, a message, or the like, and the first node may perform scanning on the another primary node based on the scanning parameter. The another primary node may be specifically primary nodes other than the first node of one or more communication domains. There may be one another primary node or more other primary nodes. This is not limited in this embodiment of this application. It may be understood that the first node and the another primary node are not both primary nodes of the one or more communication domains. That a first node performs scanning on another primary node may specifically mean that the first node is currently in a receiving state, and when the another primary node sends data, information, a message, or the like on a current operating carrier of the first node or a carrier supported by the first node, the first node may receive the data, information, message, or the like.

If the first node receives a first broadcast message of the another primary node during scanning, it may be considered that the first node discovers the another primary node during scanning. If the first node does not receive a first broadcast message of the another primary node during scanning, it may be considered that the first node does not discover the another primary node during scanning.

In step 520, when the another primary node is not discovered through scanning, the first node listens to a first broadcast message based on random listening duration.

It should be understood that the first broadcast message may be a broadcast message from one or more primary nodes other than the first node, or the first broadcast message may be a broadcast message sent by one or more primary nodes other than the first node. As described above, the broadcast message in this application may include physical layer broadcast information and a communication domain system message. For related descriptions, refer to the foregoing descriptions of terms and concepts. For brevity, details are not described herein again.

The random listening duration is used by the first node to listen to the another primary node. The first node listens to the another primary node in the random listening duration. That the first node listens to a first broadcast message based on random listening duration may be understood as that in the random listening duration, if the another primary node sends the first broadcast message, the first node may receive the first broadcast message, and the first node listens to the another primary node in the random listening duration, in other words, the first node may receive, in the random listening duration, the data, information, message, or the like sent by the another primary node. If the first node receives the first broadcast message in the random listening duration, it may be considered that the first node discovers the another primary node in the random listening duration. If the first node does not receive the first broadcast message in the random listening duration, it may be considered that the first node does not discover the another primary node in the random listening duration.

The random listening duration herein is not fixed. To be specific, for a same node, random listening duration is not fixed. For example, random listening duration of previous listening is t1, random listening duration of next listening is t2, and t1≠t2. For different nodes, random listening duration may be the same or may be different.

Because the random listening duration is introduced, when the another primary node is not discovered through scanning, the first node may continue to listen to the first broadcast message based on the random listening duration. Even if both the another primary node and the first node are in a scanning time period, because the first node continues to perform listening based on the random listening duration after scanning ends, the another primary node may start to send a broadcast message when the first node performs listening, or may send a broadcast message after the first node performs listening based on the random listening duration. However, the random listening duration of the first node may be different from random listening duration of the another primary node. In this case, broadcast time periods of the first node and the another primary node may be staggered. Even if the first node and the another primary node simultaneously perform scanning, the first node continues to perform listening based on the random listening duration, and therefore, the first node may receive the first broadcast message from the another primary node.

Even if the random listening duration of the first node is the same as that of the another primary node, because random listening duration of each node is not fixed, there is a low probability that the first node and the another primary node perform next listening based on same random listening duration. Therefore, there is a relatively high probability that the first node receives the first broadcast message from the another primary node.

Based on the foregoing solution, when the first node performs scanning on the another primary node based on the scanning parameter, but does not discover the another primary node through scanning, the first node may continue to listen, based on one random listening duration, to whether the another primary node sends the first broadcast message. The random listening duration is not fixed, and random listening duration of different nodes may also be different. In this case, broadcast time periods of the first node and another primary node may be staggered, and the first node may discover the another primary node in the random listening duration. This can alleviate a problem that the first node and the another primary node cannot discover each other because the first node and the another primary node are both in a scanning state or a broadcast state, and improve device discovery efficiency.

In addition, device discovery based on the broadcast message has a low requirement on the primary node, and device discovery between primary nodes can be performed without requiring the primary node to have an active probe capability. The active probing capability may be understood as that the primary node needs to send a probe request frame.

In a possible implementation, when a trigger condition is met, the first node performs scanning based on the scanning parameter.

The trigger condition may include: The first node is powered on, the first node detects interference, the first node enables a multi-domain service function, the first node receives a scanning request message from a second node, or the first node performs periodic scanning. The second node is a primary node other than the first node.

It should be understood that the second node may be one of one or more primary nodes associated with the first node as a secondary node. The identity of the secondary node may also be referred to as a terminal mode.

Based on different trigger conditions, the first node may perform blind scanning or targeted scanning.

A node may usually perform blind scanning on another primary node when the node is powered on. Blind scanning may be understood as that another specific primary node is discovered, or a first broadcast message of another specific primary node is received.

That the trigger condition is that the first node performs periodic scanning may specifically mean that the first node performs periodic scanning and a timer of periodic scanning stops timing. The timer of periodic scanning may be specifically configured to perform timing by using device discovery duration as a cycle. It should be understood that the device discovery duration is greater than scanning duration and the random listening duration, and the scanning duration and the random scanning duration may be included in the device discovery duration.

The node may usually perform periodic scanning. In this case, scanning may also be blind scanning. When the node enables the multi-domain service function, it indicates that the node starts the multi-domain service function. However, before multi-domain service discovery, the node first needs to perform device discovery, that is, when the node enables the multi-domain service function, scanning needs to be performed. In this case, scanning may also be blind scanning.

The node detects interference. For example, the node detects that a packet error rate increases or a throughput decreases in a time period, or the node detects interference after performing channel sounding in a time resource allocated to the node, or the node acts as a primary node and receives an interference detection report reported by a secondary node in a communication domain or another primary node reported by a secondary node in a communication domain. These cases may all be considered as that the node detects the interference. This is not limited in this application. When the node detects interference, the node may consider that a communication domain of another primary node may exist around the node. To avoid mutual interference between communication domains, the node may first discover the primary node through scanning, and then perform a multi-domain service after associating with the primary node, to perform multi-domain coordination and management. Therefore, when the node detects interference, scanning may be performed. In this case, scanning may also be blind scanning. In addition, when the first node detects the interference and triggers scanning, a problem that device discovery cannot be performed when mutual interference exists between the first node and the another primary node can be further resolved.

The first node receives the scanning request message from the second node. In this case, the first node may perform targeted scanning based on the scanning request of the second node. The scanning request message may indicate a target primary node to be discovered by the first node. Therefore, targeted scanning may be performed on the target primary node, that is, the first broadcast message of the target primary node is received in a targeted manner.

The first node is powered on, the first node detects interference, the first node enables the multi-domain service function, the first node receives the scanning request message from the second node, and the like may also be referred to as an event trigger condition. When the first node performs periodic scanning, this condition may also be referred to as a periodic trigger condition. This is not limited in this application.

It should be understood that, when the first node performs blind scanning, there may be one another primary node or more other primary nodes. That the another primary node during blind scanning is not discovered may be understood as that no other primary node is discovered either, that is, no first broadcast message of any other primary node is received during blind scanning. When the first node performs targeted scanning based on the scanning request message, the another primary node is not discovered through scanning. The another primary node herein may be understood as the target primary node indicated in the scanning request message. That the another primary node is not discovered through scanning may be understood as that the target primary node is not discovered through scanning.

Optionally, when the trigger condition is: The first node is powered on, the first node detects the interference, the first node enables the multi-domain service function, or the first node performs periodic scanning, the scanning parameter may be a predefined or preconfigured scanning parameter. Alternatively, when the trigger condition is that the first node receives the scanning request message from the second node, the scanning parameter may be determined based on the scanning request message.

When trigger conditions for triggering scanning are different, scanning parameters may be different. When the trigger condition is: The first node is powered on, the first node detects the interference, the first node enables the multi-domain service function, or the first node performs periodic scanning, or the first node performs blind scanning, the scanning parameter may be predefined or preconfigured. Being predefined or preconfigured may be understood as being predetermined by the first node. When the trigger condition is that the first node receives the scanning request message from the second node, or the first node performs targeted scanning based on the scanning request message, the scanning parameter is determined based on content in the scanning request message.

Optionally, the scanning request message may include at least one of the following: an identifier of a to-be-scanned carrier, a scanning start time offset, scanning duration on a single carrier, and information about a target primary node, where the target primary node is a primary node that is to be discovered by the first node and that is indicated in the scanning information.

The first node may scan the target primary node in a targeted manner based on the information indicated in the scanning request message such as the identifier of the to-be-scanned carrier, the scanning start time offset, the scanning duration on the single carrier, and the information about the target primary node.

It should be understood that the to-be-scanned carrier may be one carrier or may be a plurality of carriers. When the to-be-scanned carrier is the plurality of carriers, within a capability range of the first node, the first node may concurrently scan the plurality of carriers, and may not scan the carriers one by one, so that device discovery can be quickly performed.

Optionally, the information about the target primary node may include at least one of the following: an identifier of an operating carrier of the target primary node, a priority of the target primary node, a sending periodicity of a communication domain system message of the target primary node, and duration of the communication domain system message of the target primary node. The operating carrier of the target primary node belongs to the to-be-scanned carrier.

The sending periodicity of the communication domain system message may be represented by "domainSysInforPeriod". This is not limited in this application. A value of the sending periodicity of the communication domain system message may be SF64, SF128, SF256, SF512, or the like. Herein, "SF64" indicates that a start number of a superframe that may send the communication domain system message is a multiple of 64, "SF128" indicates that a start number of a superframe that may send the communication domain system message is a multiple of 128, "SF256" indicates that a start number of a superframe that may send the communication domain system message is a multiple of 256, and "SF512" indicates that a start number of a superframe that may send the communication domain system message is a multiple of 512.

The duration of the communication domain system message may be represented by "domainSysInforOnDuartion". This is not limited in this application. The duration of the communication domain system message may indicate a quantity of consecutive superframes that may be used by the communication domain system message in one sending periodicity. A value of the duration of the communication domain system message may be: SF8, SF16, SF32, SF64, or the like. Herein, "SF8" may indicate that the system message is sent in a maximum of eight consecutive superframes starting from a start superframe number, "SF16" may indicate that the system message is sent in a maximum of 16 consecutive superframes starting from the start superframe number, "SF32" may indicate that the system message is sent in a maximum of 32 consecutive superframes starting from the start superframe number, and "SF64" may indicate that the system message is sent in a maximum of 64 consecutive superframes starting from the start superframe number.

Therefore, the scanning request message may include frame synchronization information of the to-be-scanned target primary node, for example, the sending periodicity of the communication domain system message of the target primary node, duration of the broadcast message, for example, the duration of the communication domain system message of the target primary node, a carrier channel number, for example, the identifier of the operating carrier of the target primary node, and the like. The first node may perform targeted scanning based on the target primary node indicated in the scanning request message, that is, scanning is performed only on the operating carrier of the target primary node in a sending time period of the broadcast information of the target primary node. In this way, compared with scanning all carriers or channels, this manner can greatly reduce scanning duration and overheads, and increase a probability of discovering the target primary node through scanning.

Optionally, the scanning parameter may include at least one of the following: an identifier of a to-be-scanned carrier, total scanning duration, and scanning duration on a single carrier. The to-be-scanned carrier may include: a current operating carrier of the first node, or all carriers supported by the first node, or a carrier indicated in the scanning request message received by the first node.

The first node may perform scanning based on one or more scanning parameters such as the identifier of the to-be-scanned carrier, the total scanning duration, and the scanning duration on the single carrier. When the first node performs blind scanning based on the trigger condition, the first node may perform scanning on the current operating carrier of the first node, or all the carriers supported by the first node. When the first node performs targeted scanning based on the trigger condition, the first node may determine the scanning parameter based on information indicated in the scanning request message, for example, the identifier of the to-be-scanned carrier, the scanning start time offset, the scanning duration on the single carrier, and the information about the target primary node, and perform targeted scanning on the target primary node.

In a possible implementation, an associated primary node information table is pre-stored in the first node. The associated primary node information table may include a primary node associated with the first node as a secondary node and information about the primary node. The information about the primary node associated with the first node as the secondary node may include one or more of the following: an identifier of an operating carrier, a physical layer address, a domain name, a domain ID, and multi-domain service information.

The multi-domain service information may include management mode/non-management mode, a management node capability, a priority, a power supply type (whether a battery is used for power supply), whether there is an input interface, a quantity of member G nodes in a domain, and the like. This is not limited in this application. The multi-domain service information may further include a physical layer address (which may also be referred to as a physical layer identity (PID)) and/or a media access layer address (which may also be referred to as a layer 2 identity (Layer 2ID)) of the secondary node corresponding to the primary node. A correspondence is established between the PID and/or the Layer 2ID and a domain name and/or a domain ID of the primary node in the associated primary node information table, to identify a correspondence between each primary node identity and each secondary node identity in the associated primary node information table.

Optionally, the first node discovers a third node based on the first broadcast message, where the third node does not belong to a primary node in an associated primary node information table; and the first node sends an association request message to the third node in a secondary node mode.

The first node receives a first broadcast message of the third node, that is, the first node discovers the third node, and the first node determines that the third node is not in the associated primary node information table maintained by the first node. Therefore, the third node is not associated with the first node. In this case, the first node may send the association request message to the third node, so that the first node can associate with the third node as a secondary node. This avoids repeated association.

After the first node receives a communication domain system message of the third node, if the first node determines to associate with the third node as the secondary node, that is, the first node determines to join a communication domain of the third node as the secondary node, the first node may send an exchange resource control (XRC) setup request (XRCSetupRequest) message including the association request message to the third node. The message carries association request information: association request with security context (associationRequestWithSec) information or association request without security context (associationRequestNonSec) information. associationRequestWithSec and associationRequestNonSec may be used for association (authentication) requests in two different scenarios: with the security context and without the security context.

The first node sends XRCSetupRequest to the third node as the secondary node, to establish an XRC connection to the third node. The identity of the secondary node may be a PID or a layer2ID. For example, when there is the security context, a value may be the PID; or when there is no security context, a value may be the layer2ID.

After receiving the association request message of the first node, the third node may respond to the association request message of the first node, and establish the XRC connection with the first node. In this way, the first node may associate with the third node as the secondary node.

It should be further understood that, after associating with the third node as the secondary node, the first node may perform subsequent multi-domain service discovery, and exchange signaling, service information, or attribute information related to the multi-domain service with the third node. After multi-domain service discovery is successfully performed, the third node may update the associated primary node information table based on information exchanged with the first node.

Optionally, the first node discovers a fourth node based on the first broadcast message, where the fourth node is a primary node in the associated primary node information table, and the first node does not send an association request message to the fourth node.

The first node receives a first broadcast message of the fourth node, that is, the first node discovers the fourth node, and the first node determines that the fourth node is in the associated primary node information table maintained by the first node. Therefore, the fourth node first discovers the first node and is associated with the first node, in other words, the fourth node is already a secondary node of the first node. Therefore, to avoid repeated association caused by association of the first node with the fourth node as the secondary node, the first node may stop sending the association request message to the fourth node, or the first node may skip sending the association request message to the fourth node.

In a possible design, the random listening duration may be generated by a predefined function f(N), and N is a random number greater than or equal to 0.

Optionally, the random listening duration satisfies: $T_M = f(N) = NT_F$, where $T_M$ indicates the random listening duration, and $T_F$ indicates a preset time length.

$T_F$ is M times duration of eight superframes, M≥0, and M is an integer. Alternatively, $T_F$ may be duration of one superframe, duration of one half superframe, or duration of one radio frame.

For example, M=64, that is, $T_F$ is duration of 64 superframes, and the random listening duration is a product of duration of 64 superframes and N.

It should be understood that a value of $T_F$ may alternatively be duration of eight superframes, duration of 16 superframes, duration of 32 superframes, duration of 128 superframes, or the like. This is not limited in this application.

The first node may determine a specific value of the random listening duration based on the predefined function, and duration of each listening may be randomly generated. It should be understood that a specific representation form of the predefined function for determining the random listening duration is not limited in this application.

In another possible design, the random listening duration is determined based on a predefined mapping relationship, the mapping relationship includes a correspondence between a plurality of values of i and the random listening duration, i indicates a quantity of times of listening performed by one node, and i is an integer greater than or equal to 0.

For example, the mapping relationship may be in a table form, as shown in Table 1.

TABLE 1

| Sequence number | Random listening duration |
|---|---|
| 1 | $T_M$ (1) |
| 2 | $T_M$ (2) |
| 3 | $T_M$ (3) |
| . . . | . . . |
| i | $T_M$ (i) |

$T_M$ indicates the random listening duration, $T_M$ (1) may indicate duration of first listening performed by the first node, $T_M$ (2) may indicate duration of second listening performed by the first node, and $T_M$ (3) may indicate duration of third listening performed by the first node. The rest may be deduced by analogy. $T_M$ (i) may indicate duration of $i^{th}$ listening performed by the first node. It should be understood that The $T_M$ (1), the $T_M$ (2), the $T_M$ (3), and the $T_M$ (i) are all determined and stored in advance. The $T_M$ (1), the $T_M$ (2), the $T_M$ (3), and the $T_M$ (i) may have same random listening duration, or may not have same random listening duration. This is not limited in this application.

According to a communication standard, a periodicity of the superframe cannot be changed. Therefore, if one primary node and another primary node enter a scanning state, enter a broadcast state, and perform synchronization, a start time point of a broadcast message of a node may be changed, or physical layer broadcast information of a superframe and/or a communication domain system message may be changed, which are both feasible methods. However, a direct change in a start time point of the superframe may cause interruption of a communication domain synchronization signal, and communication domains needs to be synchronized again. Therefore, the start time point of the superframe may be changed based on the random listening duration $T_M$. That is, a sending periodicity of the broadcast message may be changed, to delay or advance entering the broadcast state by the primary node. In this case, time points of entering the scanning state and the broadcast state by the primary node and another primary node may be staggered. This can avoid a problem that the primary node and the another primary node cannot discover each other because the primary node and the another primary node are both in the scanning state or the broadcast state.

Optionally, the first node sends a second broadcast message on at least one carrier, where sending time of the second broadcast message is not later than planned end time of the random listening duration, the second broadcast message is used by the another primary node to discover the first node, and the at least one carrier includes the operating carrier of the first node or all the carriers supported by the first node.

It should be understood that, being not later than the planned end time of the random listening duration may be understood as being before the planned end time of the random listening duration or being at the planned end time of the random listening duration.

The planned end time may be understood as time at which a random listening duration timer ends. For example, if one random listening duration determined by the first node is the duration of one superframe, the planned end duration is end time of the duration of one superframe.

If the first node performs targeted scanning based on the indication information of the scanning request message, and discovers the target primary node before the planned end time of the random listening duration, the first node may end listening in advance, enter a broadcast state, and send the second broadcast message on the at least one carrier. If the first node performs blind scanning, or the first node performs targeted scanning based on the indication information of the scanning request message, but does not discover the target primary node at the planned end time of the random listening duration, the first node may enter a broadcast state at the planned end time of the random listening duration, and send the second broadcast message on the at least one carrier.

The first node may perform scanning, listening, and broadcasting on all operating carriers or channels of the first node, to quickly discover the another primary node and to be discovered by the another primary node.

Figure 6A:
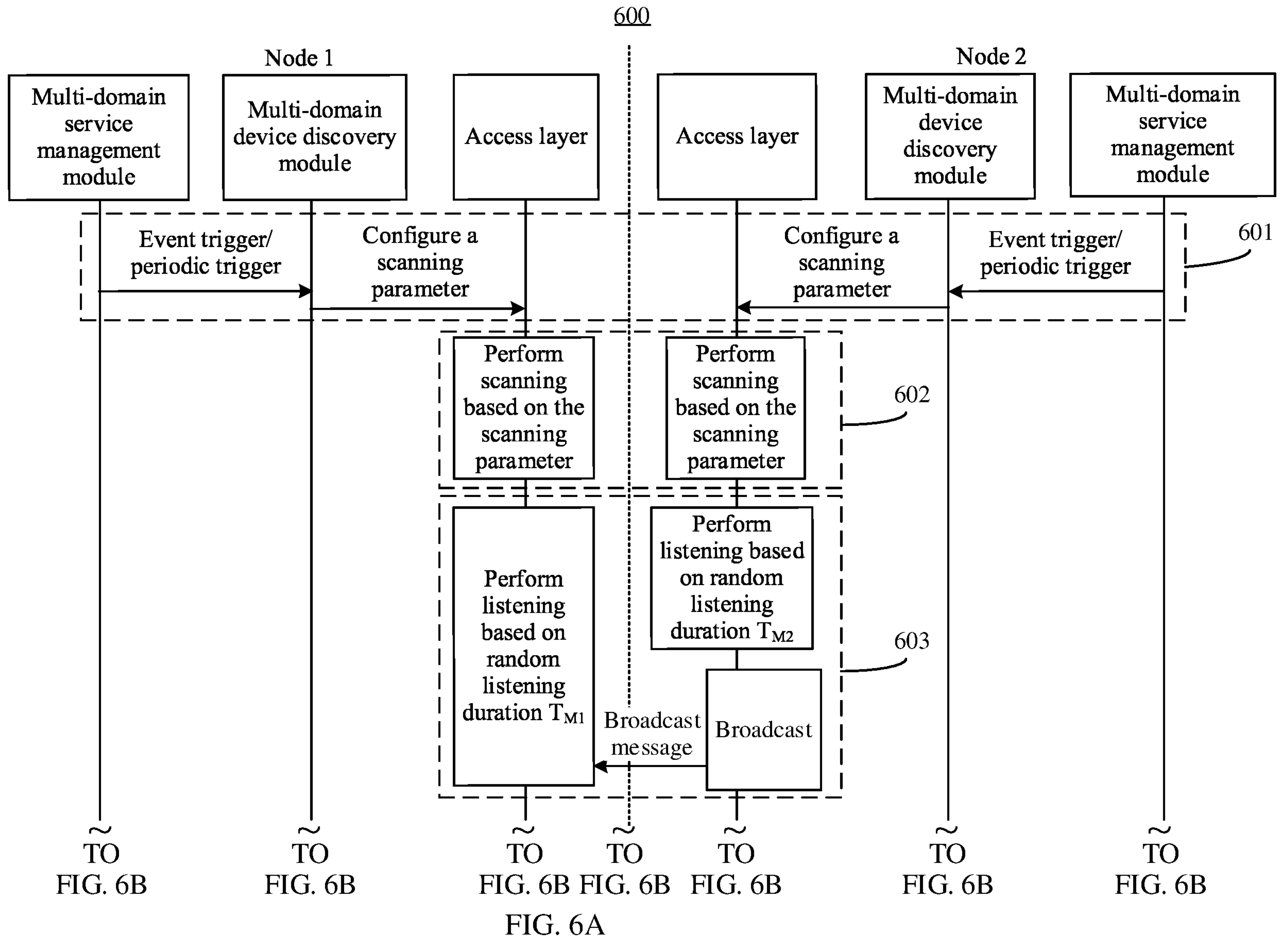
FIG. 6A and FIG. 6B are another schematic diagram of a communication method according to an embodiment of this application.
Figure 6B:
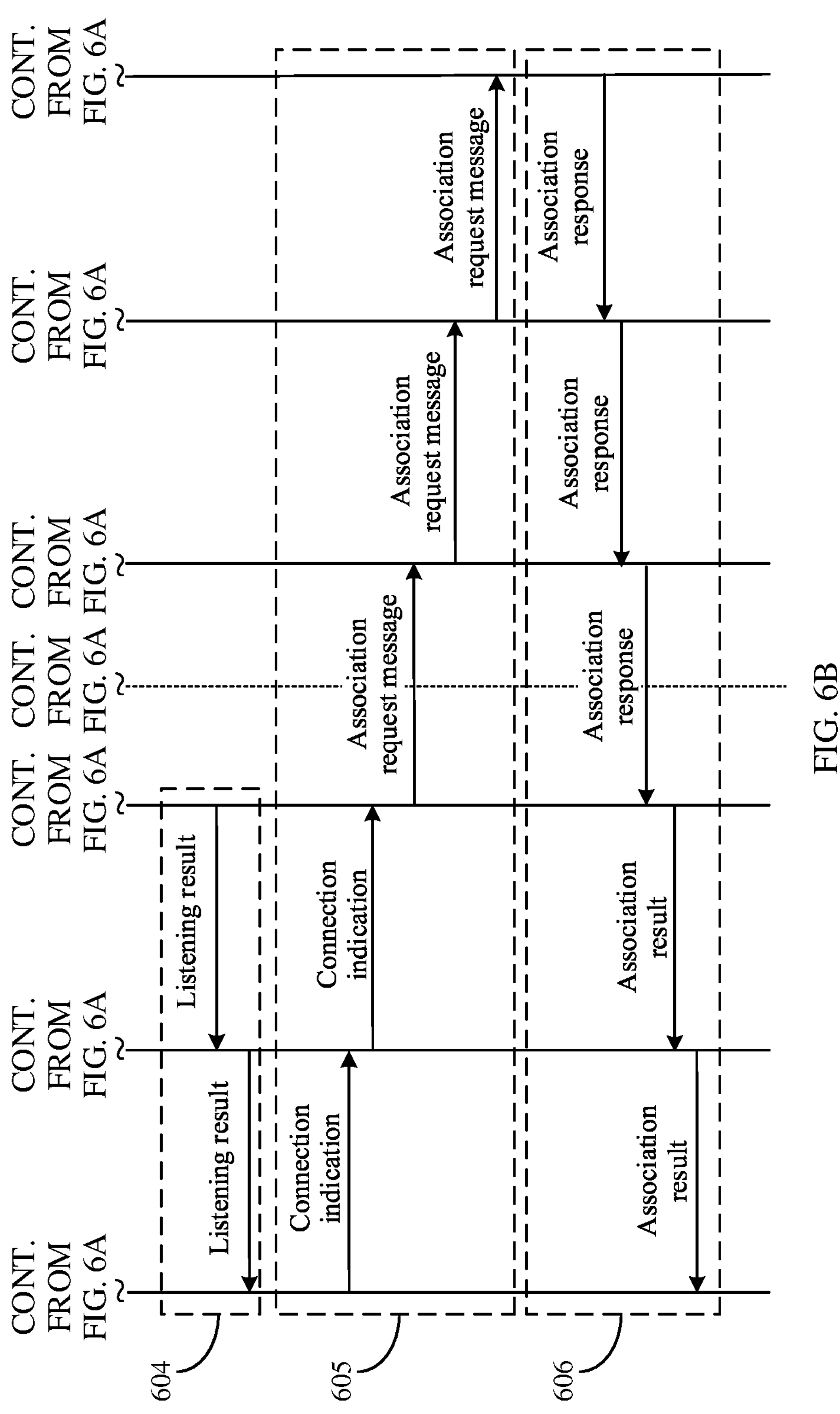

FIG. 6A and FIG. 6B are a schematic diagram of a communication method according to another embodiment of this application. The method 600 may include step 601 to step 606. The following describes step 601 to step 606 in detail.

In step 601, a multi-domain service management module of each of a node 1 and a node 2 may separately perform scanning triggering on a multi-domain device discovery module of the multi-domain service management module based on an event trigger condition or a periodic trigger condition. The multi-domain device discovery module of each of the node 1 and the node 2 may separately configure a scanning parameter based on the trigger condition, and may separately send the configured scanning parameter to an access layer.

It should be understood that each of the node 1 and the node 2 may be a first node. When the node 1 is the first node, the node 2 may be another primary node relative to the node 1. When the node 2 is the first node, the node 1 may be another primary node relative to the node 2.

In step 602, the access layer of each of the node 1 and the node 2 may perform scanning based on the received scanning parameter.

In step 603, when another primary node is not discovered through scanning, an access layer of the node 1 may listen to the another primary node based on random listening duration $T_M$1. When another primary node is discovered through scanning, an access layer of the node 2 listens to the another primary node based on random listening duration $T_M$2. $T_M$1 is greater than $T_M$2. Therefore, when the another primary node is not discovered in the random listening duration $T_M$2, the node 2 may enter a broadcast state at planned end time of the random listening duration $T_M$2, and send a broadcast message. In this case, the node 1 is still in a listening state. Therefore, the node 1 may listen to the broadcast message of the node 2, that is, the node 1 discovers the node 2 in the random listening duration $T_M$1.

In step 604, the access layer of the node 1 may report a listening result to a multi-domain device discovery module of the node 1, the multi-domain device discovery module of the node 1 may report the listening result to a multi-domain service management module of the node 1, and the multi-domain service management module of the node 1 determines that the node 2 is not in an associated primary node information table stored by the node 1.

In step 605, the multi-domain service management module of the node 1 may send a connection indication to the multi-domain device discovery module of the node 1, the multi-domain device discovery module of the node 1 may send the connection indication to the access layer of the node 1, the access layer of the node 1 may send an association request message to the access layer of the node 2, and the access layer of the node 2 may send the received association request message to a multi-domain device discovery module of the node 2. The multi-domain device discovery module of the node 2 may send the received association request message to a multi-domain service management module of the node 2.

In step 606, each module of the node 2 may respond to the association request message sent by the node 1. The access layer of the node 1 may obtain an association result based on association response of the node 2, and report the association result to the multi-domain device discovery module of the node 1. The multi-domain device discovery module of the node 1 may report the association result to the multi-domain service management module of the node 1.

It should be understood that although not shown in FIG. 6A and FIG. 6B, after being associated with the node 2, the node 1 may send a broadcast message on at least one carrier, and sending time of the broadcast message is not later than planned end time of the random listening duration $T_M$1.

The first node may configure different scanning parameters based on different trigger conditions, and perform blind scanning or targeted scanning on the another primary node. When the first node performs scanning on the another primary node based on the scanning parameter, but does not discover the another primary node through scanning, the first node may continue to listen, based on one random listening duration, to whether the another primary node sends the first broadcast message. The random listening duration is not fixed, and random listening duration of different nodes may also be different. In this case, broadcast time periods of the first node and another primary node may be staggered, and the first node may discover the another primary node in the random listening duration. This can alleviate a problem that the first node and the another primary node cannot discover each other because the first node and the another primary node are both in a scanning state or a broadcast stat, and improve device discovery efficiency. When the first node listens to the another primary node and the another primary node is not in the associated primary node information table stored by the first node, the first node may associate with the another primary node as a secondary node. When the first node listens to the another primary node but the another primary node is in the associated primary node information table stored by the first node, the first node does not associate with the another primary node as a secondary node. This can avoid a problem of repeated association between the first node and the another primary node.

To implement functions in the method provided in the foregoing embodiment of this application, the first node may include a hardware structure and/or a software module, to implement the foregoing functions by using the hardware structure, the software module, or both the hardware structure and the software module. Whether a specific function in the foregoing functions is implemented in a form of the hardware structure, the software module, or both the hardware structure and the software module depends on specific application and a design constraint condition of the technical solution.

Figure 7:
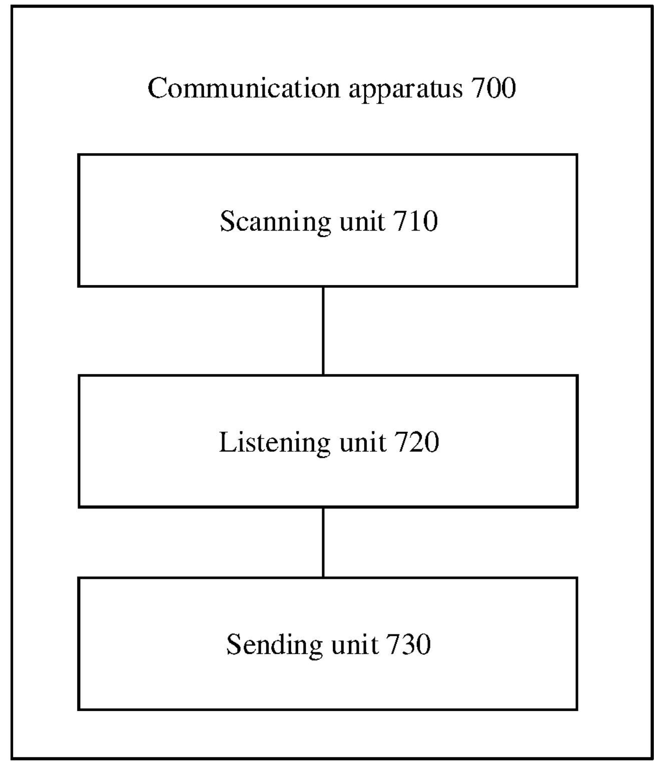
FIG. 7 is a schematic block diagram of a communication apparatus according to an embodiment of this application.

FIG. 7 is a schematic block diagram of a communication apparatus according to an embodiment of this application. As shown in FIG. 7, the communication apparatus 700 may include a scanning unit 710 and a listening unit 720. The communication apparatus 700 may be configured to perform the steps in the communication method 500 or the communication method 600.

When the communication apparatus 700 is configured to perform the steps in the communication method 500 or the communication method 600, the scanning unit 710 is configured to perform scanning on another primary node based on a scanning parameter, and the listening unit 720 may be configured to: when the another primary node is not discovered through scanning, listen to a first broadcast message based on random listening duration, where the first broadcast message is a broadcast message from one or more primary nodes in the another primary node, the random listening duration is used by the first node to listen to the another primary node, and the first node is a primary node of at least one communication domain.

Optionally, the scanning unit 710 may be further configured to: when a trigger condition is met, perform scanning based on the scanning parameter. The trigger condition includes: The first node is powered on, the first node detects interference, the first node enables a multi-domain service function, the first node receives a scanning request message from a second node, or the first node performs periodic scanning. The second node is a primary node other than the first node.

Optionally, when the trigger condition is that the first node is powered on, the first node detects interference, the first node enables a multi-domain service function, or the first node performs periodic scanning, the scanning parameter is a predefined or preconfigured scanning parameter; or when the trigger condition is that the first node receives a scanning request message from the second node, the scanning parameter is determined based on the scanning request message.

Optionally, the scanning request message includes at least one of the following: an identifier of a to-be-scanned carrier, a scanning start time offset, scanning duration on a single carrier, and information about a target primary node, where the target primary node is a primary node that is to be discovered by the first node and that is indicated in the scanning information. Optionally, the information about the target primary node includes at least one of the following: an identifier of an operating carrier of the target primary node, a priority of the target primary node, a sending periodicity of a communication domain system message of the target primary node, and sending duration of the communication domain system message of the target primary node. The operating carrier of the target primary node belongs to the to-be-scanned carrier.

Optionally, the scanning parameter includes at least one of the following: the identifier of the to-be-scanned carrier, total scanning duration, and the scanning duration on the single carrier.

Optionally, the to-be-scanned carrier includes: a current operating carrier of the first node, or all carriers supported by the first node, or a carrier indicated in the scanning request message received by the first node.

Optionally, the communication apparatus 700 may further include a sending unit 730. The sending unit 730 may be configured to: when the first node discovers a third node based on the first broadcast message, where the third node does not belong to a primary node in an associated primary node information table, send an association request message to the third node in a secondary node mode, where the associated primary node information table includes a primary node associated with the first node as a secondary node.

Optionally, the communication apparatus 700 may further include a sending unit 730. The sending unit 730 may be configured to: when the first node discovers a fourth node based on the first broadcast message, where the fourth node belongs to a primary node in an associated primary node information table, skip sending the association request message to the fourth node, where the associated primary node information table includes a primary node associated with the first node as a secondary node.

Optionally, the associated primary node information table includes one or more of the following information about at least one primary node: an identifier of an operating carrier, a physical layer address, a domain name, a domain identifier, and multi-domain service information.

Optionally, the random listening duration is generated by a predefined function f(N), and N is a random number greater than or equal to 0.

Optionally, the random listening duration satisfies: $T_M=f(N)=NT_F$, where $T_M$ indicates the random listening duration, and $T_F$ indicates a preset time length.

Optionally, $T_F$ is duration of 64 superframes, duration of one superframe, duration of one and a half superframes, or duration of one radio frame.

Optionally, the random listening duration is determined based on a predefined mapping relationship, the mapping relationship includes a correspondence between a plurality of values of i and the random listening duration, i indicates a quantity of times of listening performed by one node, and i is an integer greater than or equal to 0.

Optionally, the communication apparatus 700 may further include a sending unit 730. The sending unit 730 may be configured to send a second broadcast message on at least one carrier, where sending time of the second broadcast message is not later than planned end time of the random listening duration, the second broadcast message is used by the another primary node to discover the first node, and the at least one carrier includes the operating carrier of the first node or all the carriers supported by the first node.

Figure 8:
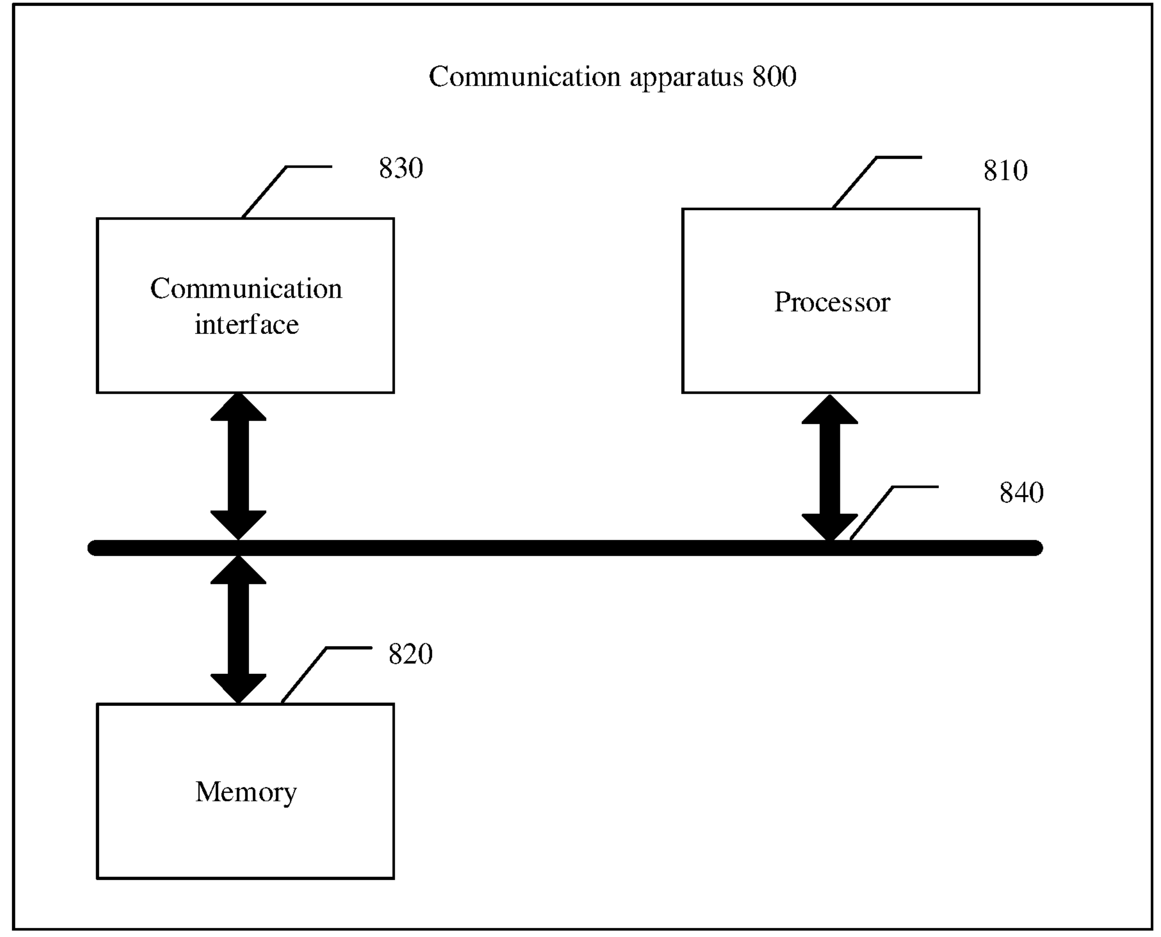
FIG. 8 is another schematic diagram of a communication apparatus according to an embodiment of this application.

FIG. 8 is another schematic diagram of a communication apparatus according to an embodiment of this application. The communication apparatus 800 may be configured to implement a function of the first node in the foregoing method. The communication apparatus 800 may be a chip system. In this embodiment of this application, the chip system may include a chip, or may include a chip and another discrete component.

As shown in FIG. 8, the communication apparatus 800 may include at least one processor 810, configured to implement a function of the first node in the method provided in embodiments of this application.

For example, when the communication apparatus 800 is configured to implement the function of the first node in the communication method provided in embodiments of this application, the processor 810 may be configured to: perform scanning based on a scanning parameter, where the scanning includes scanning of another primary node; and when the another primary node is not discovered through scanning, listen to a first broadcast message based on random listening duration. The first broadcast message is a broadcast message from one or more primary nodes in the another primary node. The random listening duration is used by the first node to listen to the another primary node. The first node is a primary node of at least one communication domain. For details, refer to the detailed descriptions in the method examples. Details are not described herein again.

The apparatus 800 may further include at least one memory 820, configured to store program instructions and/or data. The memory 820 is coupled to the processor 810. The coupling in this embodiment of this application may be an indirect coupling or a communication connection between apparatuses, units, or modules in an electrical form, a mechanical form, or another form, and is used for information exchange between the apparatuses, the units, or the modules. The processor 810 may operate with the memory 820 together. The processor 810 may execute the program instructions stored in the memory 820. At least one of the at least one memory may be included in the processor.

The communication apparatus 800 may further include a communication interface 830, configured to communicate with another device by using a transmission medium, so that an apparatus in the communication apparatus 800 may communicate with the another device. For example, the another device may be a primary node other than the first node. The communication interface 830 may be, for example, a transceiver, an interface, a bus, a circuit, or an apparatus that can implement receiving and sending functions. The processor 810 may receive and send data and/or information by using the communication interface 830, and is configured to perform the method performed by the first node in the embodiment corresponding to FIG. 8.

A specific connection medium between the processor 810, the memory 820, and the communication interface 830 is not limited in this embodiment of this application. In this embodiment of this application, in FIG. 8, the processor 810, the memory 820, and the communication interface 830 are connected by using a bus 840. The bus 840 is represented by using a bold line in FIG. 8. A manner of connection between other components is only an example for description, and imposes no limitation. The bus may be classified into an address bus, a data bus, a control bus, and the like. For ease of representation, only one bold line is used in FIG. 8 to represent the bus. However, it does not indicate that there is only one bus or only one type of bus.

This application further provides a chip system. The chip system includes at least one processor, configured to implement a function in the method performed by the first node in the embodiment shown in FIG. 5 or FIG. 6A and FIG. 6B, for example, receiving or processing of data and/or information in the foregoing method.

In a possible design, the chip system further includes a memory. The memory is configured to store program instructions and data, and the memory is located inside the processor or outside the processor.

The chip system may include a chip, or may include a chip and another discrete device.

This application further provides a computer program product. The computer program product includes a computer program (which may also be referred to as code or instructions). When the computer program is run, the first node is enabled to perform the method in any one of the embodiment shown in FIG. 5 or the embodiment shown in FIG. 6A and FIG. 6B.

This application further provides a computer-readable storage medium. The computer-readable storage medium stores a computer program (which may also be referred to as code or instructions). When the computer program is run, the first node is enabled to perform the method in any one of the embodiment shown in FIG. 5 or the embodiment shown in FIG. 6A and FIG. 6B.

This application further provides a terminal, including the communication apparatus shown in FIG. 7 or FIG. 8.

Optionally, the terminal may be a vehicle.

It should be understood that, the processor in this embodiment of this application may be an integrated circuit chip, and has a signal processing capability. In an implementation process, the steps in the foregoing method embodiments can be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams that are disclosed in embodiments of this application can be implemented or performed. The general-purpose processor may be a microprocessor, or any conventional processor. The steps in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Based on description used as an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any other proper types of memories.

The terms such as "unit" and "module" used in this specification may be used to indicate computer-related entities, hardware, firmware, combinations of hardware and software, software, or software being executed.

A person of ordinary skill in the art may be aware that, in combination with illustrative logical blocks described in embodiments disclosed in this specification and steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiment is only an example. For example, division into the units is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In the foregoing embodiments, all or some of the functions of the functional units may be implemented by using software, hardware, firmware, or any combination thereof. When software is used to implement the functions, all or some of the functions can be implemented in a form of a computer program product. The computer program product includes one or more computer instructions (programs). When the computer program instructions (programs) are loaded and executed on the computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), or an optical medium (for example, a digital versatile disc (digital video disc, DVD)), a semiconductor medium (for example, a solid-state disk (solid state disk, SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

performing, by a first node, scanning for another primary node based on a scanning parameter, wherein the first node is a primary node of at least one communication domain; and when it is determined by the first node that the another primary node is not discovered through the scanning, listening, by the first node, to a first broadcast message based on random listening duration, wherein the first broadcast message is a broadcast message from the another primary node, and the random listening duration is used by the first node to listen to the another primary node.

2. The method according to claim 1, wherein the performing, by a first node, scanning for a primary node based on a scanning parameter comprises:

when it is determined by the first node that a trigger condition is met, performing, by the first node, scanning based on the scanning parameter, wherein the trigger condition comprises: the first node is powered on, the first node detects interference, the first node enables a multi-domain service function, the first node receives a scanning request message from a second node, or the first node performs periodic scanning, wherein the second node is a primary node other than the first node.

3. The method according to claim 2, wherein when the trigger condition is the first node is powered on, the first node detects the interference, the first node enables the multi-domain service function, or the first node performs periodic scanning, the scanning parameter is a predefined or preconfigured scanning parameter; or when the trigger condition is that the first node receives the scanning request message from the second node, the scanning parameter is determined based on the scanning request message.

4. The method according to claim 2, wherein the scanning request message comprises at least one of: an identifier of a to-be-scanned carrier, a scanning start time offset, scanning duration on a single carrier, and information about a target primary node, wherein the target primary node is a primary node that is to be discovered by the first node and that is indicated in the scanning information.

5. The method according to claim 4, wherein the information about the target primary node comprises at least one of: an identifier of an operating carrier of the target primary node, a priority of the target primary node, a sending periodicity of a communication domain system message of the target primary node, and duration of the communication domain system message of the target primary node, wherein the operating carrier of the target primary node belongs to the to-be-scanned carrier.

6. The method according to claim 1, wherein the scanning parameter comprises at least one of: the identifier of the to-be-scanned carrier, total scanning duration, and the scanning duration on the single carrier.

7. The method according to claim 6, wherein the to-be-scanned carrier comprises:

a current operating carrier of the first node, or all carriers supported by the first node, or a carrier indicated in the scanning request message received by the first node.

8. The method according to claim 1, wherein the method further comprises:

discovering, by the first node, a third node based on the first broadcast message, wherein the third node does not belong to a primary node in an associated primary node information table, and the associated primary node information table comprises a primary node associated with the first node as a secondary node; and sending, by the first node, an association request message to the third node in a secondary node mode.

9. The method according to claim 1, wherein the method further comprises:

discovering, by the first node, a fourth node based on the first broadcast message, wherein the fourth node belongs to a primary node in an associated primary node information table, and the associated primary node information table comprises a primary node associated with the first node as a secondary node; and skipping sending, by the first node, an association request message to the fourth node.

10. The method according to claim 8, wherein the associated primary node information table comprises, about at least one primary node, one or more of: an identifier of an operating carrier, a physical layer address, a domain name, a domain identifier, and multi-domain service information.

11. The method according to claim 1, wherein the random listening duration is generated by a predefined function f(N), and N is a random number greater than or equal to 0.

12. The method according to claim 11, wherein the random listening duration satisfies: $T_M=f(N)=NT_F$, wherein $T_M$ indicates the random listening duration, and $T_F$ indicates a preset time length.

13. The method according to claim 12, wherein $T_F$ is duration of 64 superframes, duration of one superframe, duration of one half superframe, or duration of one radio frame.

14. The method according to claim 1, wherein the random listening duration is determined based on a predefined mapping relationship, the mapping relationship comprises a correspondence between a plurality of values of i and the random listening duration, i indicates a quantity of times of listening performed by one node, and i is an integer greater than or equal to 0.

15. The method according to claim 1, wherein the method further comprises:

sending, by the first node, a second broadcast message on at least one carrier, wherein sending time of the second broadcast message is not later than planned end time of the random listening duration, the second broadcast message is used by the another primary node to discover the first node, and the at least one carrier comprises the operating carrier of the first node or all the carriers supported by the first node.

16. A communication apparatus, applied to a first node, and the communication apparatus comprising:

at least one processor; and one or more memories coupled to the at least one processor and storing instructions for execution by the at least one processor to perform operations comprising:

performing, scanning for another primary node based on a scanning parameter, wherein the first node is a primary node of at least one communication domain; and when it is determined by the least one processor that the another primary node is not discovered through scanning, listening, to a first broadcast message based on random listening duration, wherein the first broadcast message is a broadcast message from the another primary node, and the random listening duration is used by the first node to listen to the another primary node.

17. The communication apparatus according to claim 16, wherein the performing, scanning for another primary node based on a scanning parameter comprises:

when it is determined by the at least one processor that a trigger condition is met, performing, scanning based on the scanning parameter, wherein the trigger condition comprises: the first node is powered on, the first node detects interference, the first node enables a multi-domain service function, the first node receives a scanning request message from a second node, or the first node performs periodic scanning, wherein the second node is a primary node other than the first node.

18. The communication apparatus according to claim 17, wherein when the trigger condition is: the first node is powered on, the first node detects the interference, the first node enables the multi-domain service function, or the first node performs periodic scanning, the scanning parameter is a predefined or preconfigured scanning parameter; or when the trigger condition is that the first node receives the scanning request message from the second node, the scanning parameter is determined based on the scanning request message.

19. The communication apparatus according to claim 17, wherein the scanning request message comprises at least one of the following: an identifier of a to-be-scanned carrier, a scanning start time offset, scanning duration on a single carrier, and information about a target primary node, wherein the target primary node is a primary node that is to be discovered by the first node and that is indicated in the scanning information.

20. The communication apparatus according to claim 19, wherein the information about the target primary node comprises at least one of: an identifier of an operating carrier of the target primary node, a priority of the target primary node, a sending periodicity of a communication domain system message of the target primary node, and duration of the communication domain system message of the target primary node, wherein the operating carrier of the target primary node belongs to the to-be-scanned carrier.

* * * * *